United States Patent [19]

Wallace

[11] 3,994,112
[45] Nov. 30, 1976

[54] FRAMING MEMBER AND JOINTS

[75] Inventor: James Wallace, Sonning, England

[73] Assignee: Ideal Casements (Reading) Limited, England

[22] Filed: Mar. 6, 1975

[21] Appl. No.: 555,991

Related U.S. Application Data

[62] Division of Ser. No. 488,848, July 15, 1974, Pat. No. 3,968,614.

[52] U.S. Cl. .................................. 52/730; 52/729; 52/758 F; 403/174; 403/401; 52/656; 52/665
[51] Int. Cl.² .......................................... E04C 3/30
[58] Field of Search .......... 403/174, 178, 346, 264, 403/231, 292, 295, 401, 402, 388; 52/720, 729, 730, 731, 756, 582, 584, 665, 656, 758 H, 475, 758 F

[56] References Cited
UNITED STATES PATENTS

| | | |
|---|---|---|
| 2,508,066 | 5/1950 | Holmstrom ........................ 52/731 |
| 2,941,855 | 6/1960 | Weill ....................... 52/758 H UX |
| 3,451,183 | 6/1969 | Lespagnol et al. ................. 52/656 |
| 3,471,182 | 10/1969 | Schroer ............................ 403/231 |
| 3,609,930 | 10/1971 | Crandal ......................... 52/584 X |

FOREIGN PATENTS OR APPLICATIONS

| | | |
|---|---|---|
| 1,806,019 | 5/1970 | Germany ......................... 403/292 |
| 6,611,089 | 3/1967 | Netherlands ..................... 403/402 |

*Primary Examiner*—Wayne L. Shedd
*Attorney, Agent, or Firm*—Wenderoth, Lind & Ponack

[57] ABSTRACT

Framing members of metal are produced from three tubular elements in parallel adjacent relationship held together by transverse fasteners. Sealing strips are located between the adjacent surfaces of the elements and subjected to pressure by the fasteners. In one form of the invention each of the fasteners comprises two pins, each of which passes through two elements so that the pin ends lie in opposed juxtaposition within a common element of the three and are secured together by collets. Alternatively, welded studs are employed. The members are joined together to form a frame by internal blocks shaped to suit the shape of the joint, e.g. angle or tee, and secured by clamping screws or riveting.

7 Claims, 9 Drawing Figures

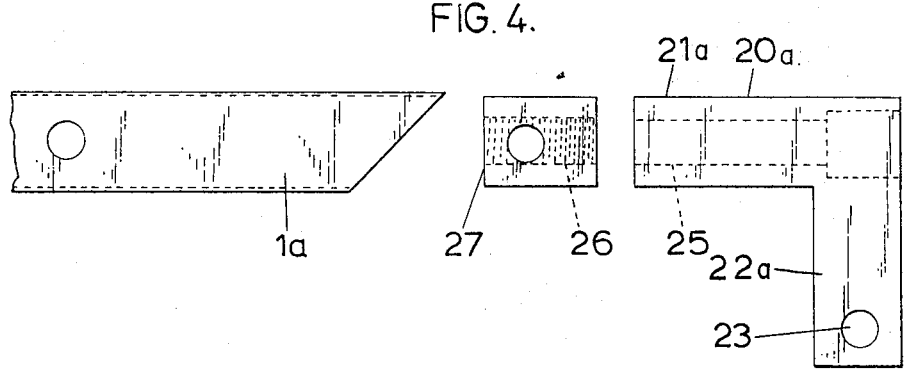
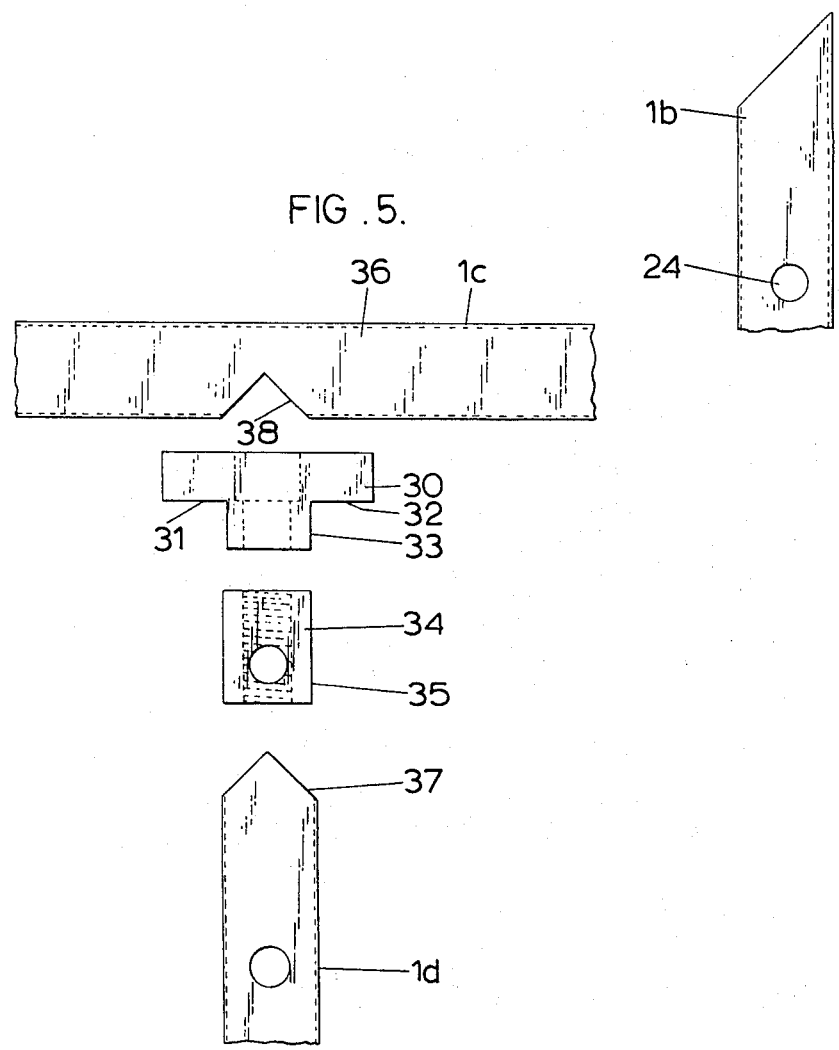

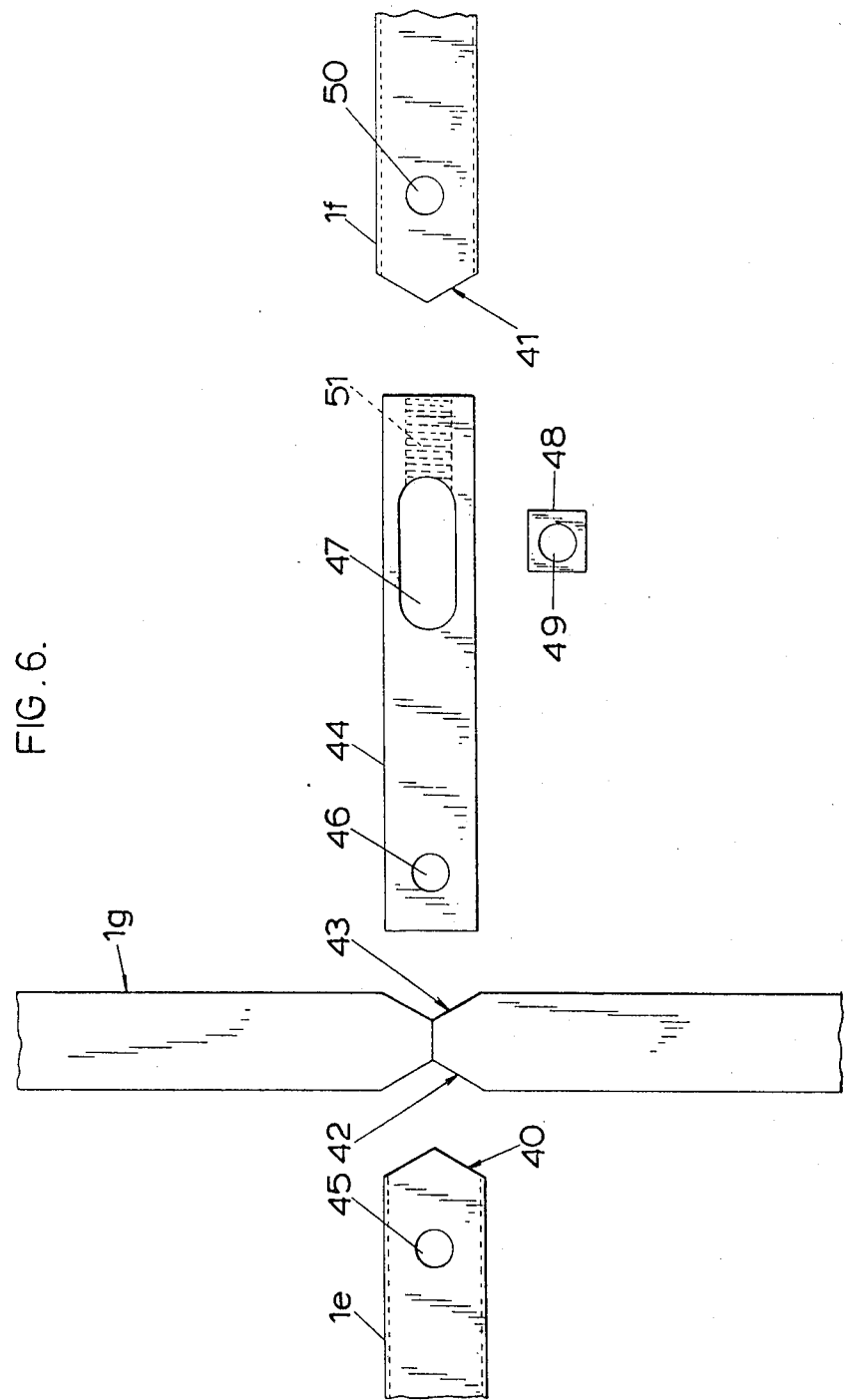

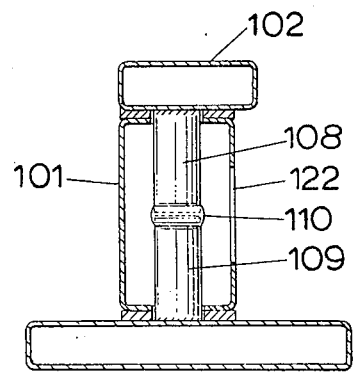
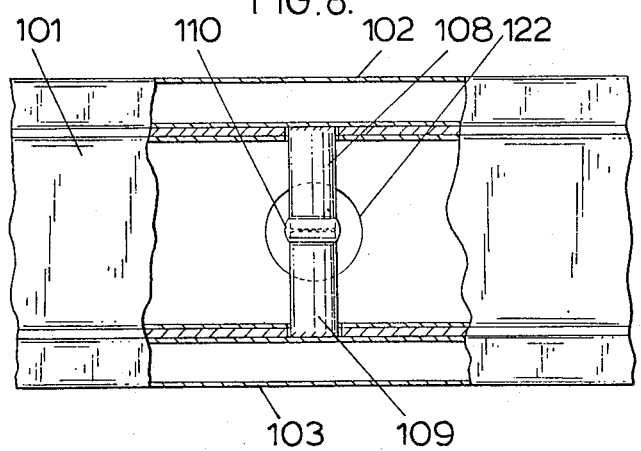
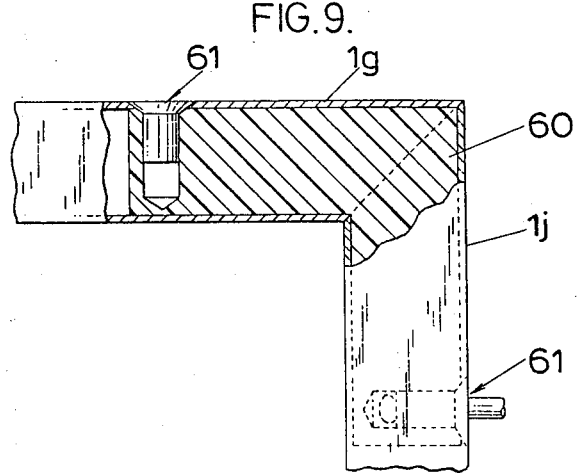

FRAMING MEMBER AND JOINTS

This is a division of application Ser. No. 488,848, filed July 15, 1974, now U.S. Pat. No. 3,968,614.

BACKGROUND OF THE INVENTION

This invention relates to framing and in particular to metal framing primarily but not exclusively for use as window framing.

At present, metal window framing is commonly made of steel or aluminium. For a variety of commercial reasons, mild steel is usually preferred but this material has the disadvantage that it normally requires a surface finish to prevent corrosion in use and to achieve a satisfactory appearance. Furthermore, the exposed surfaces of such framing often require regular maintenance, for example, painting. Stainless steel overcomes the corrosion and maintenance problems and has a satisfactory appearance for many installations but it is expensive to produce and difficult to work during the framing manufacture.

SUMMARY OF THE INVENTION

It is the object of the present invention to provide framing members suitable for framing which is inexpensive in manufacture, is easily installed and, subsequently, requires little or no maintenance, and which also can be produced with a variety of visible surface finishes as required.

In accordance with the invention a framing member for metal framing comprises three elongated tubular elements lying in parallel relationship, each such element having at least one plane surface adjacent to a similar plane surface of another element, resilient sealing strips located between each pair of adjacent plane surfaces, and transverse fasteners securing the elements together in two or more places along their lengths, the fastener elements being adapted to exert pressure on the sealing strips.

With such a construction, the elements can be made from different materials, so that those visible when the member is installed can be made of an expensive material or decoratively finished, and those elements which are hidden can be made of a cheaper material, e.g. mild steel.

In one form of the invention, each fastener comprises two pins, each such pin passing through two elements so that the pin ends lie in opposed juxtaposition within a common element of the three and are secured together by a collect which engages grooves in the pin ends.

In another form of the invention two of the elements have expanding head rivets or welded studs projecting from their plane surfaces which pass through holes in the adjacent plane surfaces of the third element, which lie between the two first-mentioned elements, so that the protruding ends of the rivets lie in juxtaposition within the third element. After the elements of the assembly are compressed to apply compression to the sealing strips, the adjacent rivet ends are permanently joined by welding, holes being provided in a wall of the third element to allow access to the rivets or studs for the welding operation.

The invention also includes a plurality of the framing members assembled and joined together to form a framing.

BRIEF DESCRIPTION OF THE DRAWINGS

Embodiments of the invention are illustrated in the accompanying drawings wherein:

FIG. 4 shows, in elevation, the parts employed in joining the ends of two members at right angles;

FIG. 5 shows, in elevation, the parts employed in producing a T-joint between two members;

FIG. 6 shows, in elevation, the parts employed in producing a joint between members crossing at right angles;

FIG. 7 shows a cross-section of another framing member with an alternative form of fastener;

FIG. 8 shows a side view, partly cut away, of a short length of the same member; and FIG. 9 shows a sectioned elevation of a further form of corner joint between members meeting at right angles.

DETAILED DESCRIPTION OF THE INVENTION

Figure 1:
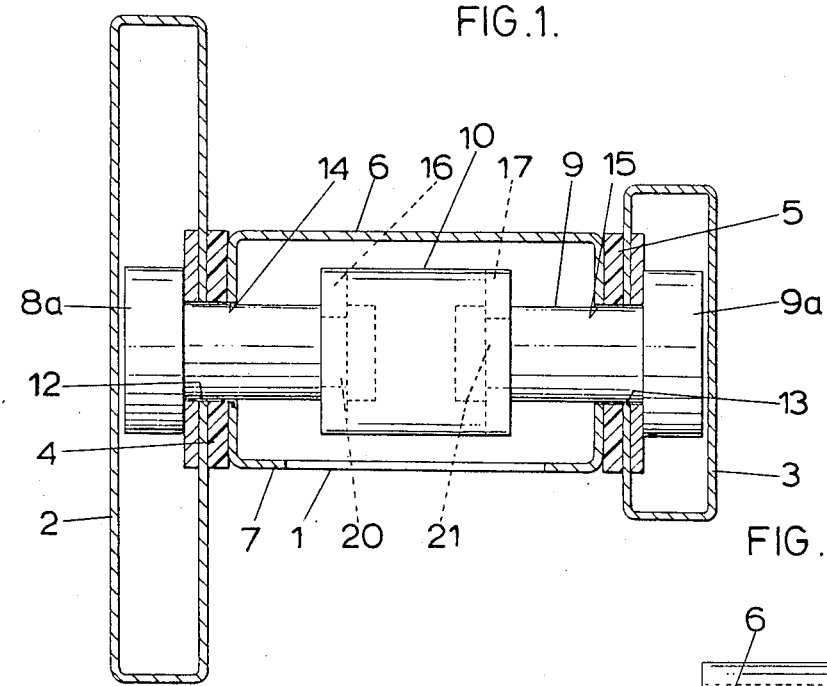
FIG. 1 shows a cross-section of a framing member according to the invention.
Figure 3:
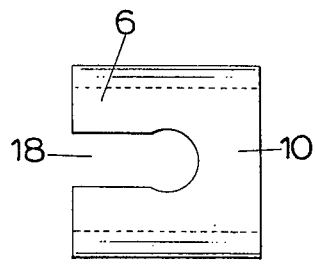
FIG. 3 shows an elevation of a connecting piece employed in the construction of the member.
Figure 2:
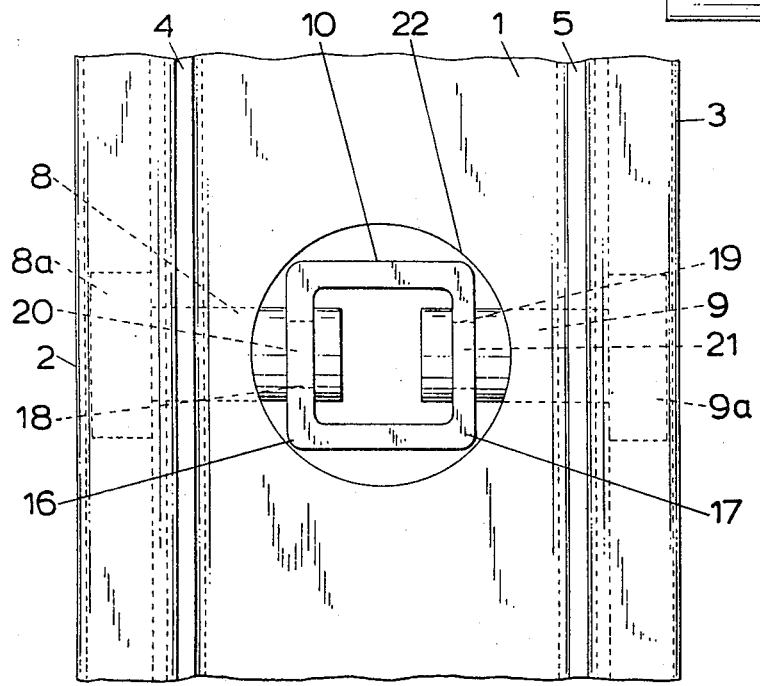
FIG. 2 shows a side view of a short length of the member shown in FIG. 1.

The framing members hereinafter to be described with reference to FIGS. 1–3 can be assembled together by joints exemplified in FIGS. 4, 5 and 6 to provide a variety of framing structures, glazed or unglazed, for windows, partitions, barriers, doors, vehicle body members, greenhouses, prefabricated buildings, racking and other purposes. The exterior profile of each member is dependent upon its intended purposes and what glazing or other sheet material, hinge parts, catches, or locks, if any, is to be secured or to be mounted on the framing. However, each member basically comprises three parallel tubes fastened together, each of which has one plane surface adjacent a plane surface of another element with resilient sealing strips between each pair of adjacent surfaces. To simplify an understanding of the invention, in the embodiment about to be described each tube is of a plain rectangular section as best shown in FIG. 1. One of the tubes is made of mild steel and forms a main structural part of the member and a base for the attachment of the other two secondary tubes 2, 3 one on each of two of its opposed walls. The secondary tubes, which are normally visible when the finished member is installed in a building may be made of a variety of materials for example, stainless steel, plastics, or mild steel with any selected surface finish or coating as may be required to present a pleasing appearance, and/or protection against corrosion. The secondary tubes are of a pronounced "flat" shape, that is to say, two of their opposite walls are considerably wider than the other two so that the secondary tubes overhang the sides of the main tube which lie adjacent the surrounding masonry or timber when the frame is installed and the edges of the frame glazing respectively.

A sealing fillet, 4, 5 of resilient material, e.g. a rubber or plastics composition, is placed between each secondary tube and the main tube walls. One of the fillets may extend beyond one of the side faces 6 or 7 of the main tube 1 and be enlarged to form a grooved housing to receive one edge of a glass sheet enclosed by the frame. This glass sheet can be secured in position by a glazing strip of tubular channel, or other suitable section lying against the main tube, and abutting both the housing part of the fillet and an overhanging surface of one or another of the secondary tubes, so as to compress the housing part and ensure tightly sealed retention of the glass. If the frame is intended for use as a hinged casement or to surround such a hinged casement either or both fillets may be extended beyond the main tube and upon an overhanging part of a secondary tube to form a weather seal or seals between the casement and its surrounding frame and hinged parts may be secured to an appropriate end of te secondary tube.

The three tubes of each framing element are secured together by transverse fasteners located in at least two spaced-apart positions intermediate the tube ends. In the majority of cases, it is sufficient to provide two fasteners on each framing element at positions near the opposite tube ends.

In the form shown in the drawings each fastener comprises two coaxial pins, 8, 9 and a collet 10 connecting the pins and located within the main tube 1. The pins have head portions 8a, 9a, lying within the secondary tubes 2, 3 and are located in key-hole slots 12, 13 formed in the inner face of the secondary tubes. The shanks are passed through registering holes 14, 15 in the juxtaposed main tube walls so that the shank ends face each other within the main tube. The collect 10 is box-shaped and has opposed walls, 16, 17 which are slotted at 18, 19 to slide into annular grooves 20, 21 in the pin shanks and prevent endwise movement of the pins. During assembly, pressure is applied to the assembly of the tubes, compressing the sealing fillets and causing the pins of each fastener to be brought into position to receive the collet. As a result the pins are subjected to tension after the pressure is removed thus preventing subsequent movement or dislodgement of the collet and ensuring a tight seal between the fillets and the tube walls.

Alternatively, the collets may be U-shaped and made from spring steel in such a manner that, by the use of a tool, they can be expanded and then fitted to the pins. When the tool is removed, the collets contract thus pulling the pins together and clamping the tubes onto the sealing fillets.

Access holes are formed in the tube to allow the pins and collets to be installed during the assembly stage. These holes, e.g. 22, are subsequently sealed with suitable plugs. The plugs sealing the access holes in the main tubes to the collets may include a headed screw bearing on the collet to further assist in its retention and carrying sealing washers which, by the reaction pressure of the screws, are pressed firmly against the inside of the access holes. The screw heads may be adapted to form retaining means for a glazing bead or strip. Alternatively and/or additionally, bonding materials such as cold setting or thermosetting adhesive may be used to attach the secondary tubes to the main tubes.

In another form of fastener (FIGS. 7 and 8) the pins, 8, 9 are replaced by studs 108, 109 welded to the secondary tubes or by rivets with expanding heads passed through holes in the secondary tubes 102, 103 and secured in the case of rivets by expanding the rivet heads. In place of the collet 10, the rivet or stud ends are permanently joined, after the tubes have been squeezed together to compress the fillets, by welding, as at 110, the welding tool being passed through the access hole 122 in the main tube 101.

Corner joints between the members forming adjacent sides of the frame may be secured by clamp devices as shown in FIG. 4 engaging the two main tubes of the respective members. The ends of the members are mitred and an L-shaped member 20a is fitted into the hollow ends of the two main tubes 1a, 1b, so that its limbs 21a and 22a form end plugs within the tubes. One of the limbs 22a, is drilled at 23 to receive a pin extending transversely through a pre-formed hole 24 in a wall of its enclosing main tube, 1b, each of the secondary tubes having a clearance hole appropriately positioned in its wall adjacent the main tube for the protruding ends of the pin, and one of the secondary tubes having an access aperture provided to allow the pin to be inserted. The pin is a push fit in the limb of the L-shaped member and the access aperture is plugged after the pin has been installed. The other limb 21a of the member is bored longitudinally at 25 to receive a clamping screw (not shown) which engages a threaded hole 26 in a block 27 also pinned within the respective main tube 1a beyond the member limb 21a. the clamping screw, which is accessible through the end of the main tube 1b in which it lies, is tightened by an appropriate tool, for example a screwdriver or Allen key, to pull up the joint and render it rigid. The L-shaped member can be made from a moulded plastics material and include fins extending outwardly from its surfaces across the corner of the "L" and which are trapped between the mitred ends of the elements to form joint seals. Since the clamped device lies wholly within the main tubes it is hidden when the element is installed in a window aperature. A metal, rubber or plastics plug may be fitted to the tool access hole.

As shown in FIG. 5, a similar form of clamping device may be used to secure a joint where the end of one member is secured to an intermediate part of a second member, for example where a glazing bar joins a frame upright. In such a clamping device the L-shaped member is replaced by a T-shaped member 30 having two outwardly extending limbs 31, 32 forming the cross-parts of the "T" extending along the main tube 1c of the second element and the upright limb 33 of the T which also receives the clamping screw is housed within the end of the main tube 1d of the first-mentioned member. The joint is pulled up by the clamping screw (not shown) which engages a threaded hole 34 in a block 35 pinned in the main tube 1d of the first-mentioned member and is accessible through a suitable aperature 36 in the main tube of the second member. To ensure a close fitting joint, the end of the first member is mitred to present an arrow head 37 which closely fits a corresponding V-shaped notch 38 cut in the second member. The T-shaped member may be made of a plastics material and its surfaces finned to form sealing fillets which are compressed between the mitred end of the first member and the notch edges in the other member to prevent the ingress of water at the joint.

Where members meet to form a X-joint the arrangement shown in FIG. 6 is employed. In such a joint the ends of the main tubes 1e, 1f of two co-axial horizontal members are mitred to form arrow heads 40, 41 to mate within notches 42, 43 cut in the opposite sides of the main tub 1g of a vertical member. A bar 44 lying partly within each of the tubes 1e, 1f extends transversely through the bore of the tube 1g. One end of the bar is pinned within the tube 1e by a pin passing through registering holes 45, 46 in the tube and bar, respectively, the part of the bar lying within the tube 1f is slotted longitudinally, the slot 47 slidably housing a square plug 48 pinned within the tube 1f through registering holes 49, 50. A screw housed in a threaded hole 51, extending from the end of the slot to the nearer end of the bar is rotated to bear on the plug so drawing the tubes 1e, 1f tightly into contact with the tube 1g. As in the previously described joints the bar member may be made of a plastics material with finned surfaces to form sealing fillets between the mating edges of the tubes.

An alternative method of forming a joint between connected framing members as shown in FIG. 9 utilizes a shaped block 60 of metal or, more preferably, thermoplastics material located within the spaces formed by the communicating interiors of the main tubes 1g, 1j of the meeting members at the joint, the block thus forming a rigid plug within the members. The members are pressed together after the block is inserted and the block is then rivetted in place as at 61 through the walls of the main tubes which are not visible when the framing is installed. If thermoplastics material is employed in constructing the block it can be further anchored by heat treating the joint to heat seal the block to the adjacent tube surfaces. A similar procedure may be employed for joining the secondary tubes of members and in such joints rivetting is avoided by piercing holes in the tube walls for the block material to flow therein and form anchoring protrusions when heated.

What we claim is:

1. Framing constructed from a plurality of framing members; each said framing member comprising three elongated tubular elements lying in sequential parallel relationship, each said element having at least one plane surface adjacent a similar plane surface of another of the elements, resilient sealing strips located between each pair of adjacent plane surfaces, and composite transverse fasteners each comprising a plurality of portions the end portions of each fastener extending inwardly through one pair of elements the inner ends of said portions being tensionally joined, thereby securing all three said elements together and located in at least two places along the lengths of said three elements, the fasteners comprising means to exert pressure on the sealing strips; said framing members being rigidly secured together at the joints where they meet by clamping devices joining respective of the tubular elements of each said framing member.

2. Framing as claimed in claim 1, wherein each clamping device comprises a member shaped to lie within a space formed by the interiors of the adjacent tubular elements and having a limb housed within each of the adjacent tubular elements, one of the limbs being connected to a block, which is fixed within a respective tubular element, by screw means operable to apply tension to said one limb for tightening the device, the remaining limb or limbs being fixed within their respective tubular elements.

3. Framing as claimed in claim 1, wherein at least one of the clamping devices secures two framing members together in a corner joint and includes a shaped member of L configuration.

4. Framing as claimed in claim 1, having at least one joint at the intersection of the end of a first framing member with a second framing member intermediate the ends thereof, the clamping device at the joint including a shaped member of T configuration.

5. Framing as claimed in claim 1, having at least one joint formed by the intersection of the ends of two co-axial framing members with a third framing member intermediate the ends thereof, the clamping device at the joint including a bar-shaped member extending into the elements of said two co-axial members and transversely through the element of the said third framing member therebetween.

6. Framing as claimed in claim 1, wherein each clamping device comprises a block-like member shaped to lie within spaces formed by the interiors of the adjacent tubular elements, said member being secured therein by rivets passing through the walls of said tubular elements.

7. Framing as claimed in claim 1, wherein said fasteners are removable.

* * * * *